United States Patent [19]

Mann

[11] Patent Number: 4,926,024

[45] Date of Patent: May 15, 1990

[54] WELDING GUN CABLE SADDLE

[75] Inventor: Robert N. Mann, Mississauga, Canada

[73] Assignee: Mig Vac Inc., Mississauga, Canada

[21] Appl. No.: 434,274

[22] Filed: Nov. 13, 1989

[51] Int. Cl.[5] .................................................. B23K 9/00

[52] U.S. Cl. ............................. 219/137.31; 219/137.9

[58] Field of Search ................ 219/137.31, 137.9, 136, 219/137.51, 137.41

[56] References Cited

U.S. PATENT DOCUMENTS 4,496,823 1/1985 Mann .............................. 219/137.41

*Primary Examiner*—Clifford C. Shaw

*Attorney, Agent, or Firm*—Sim & McBurney

[57] ABSTRACT

To prevent abrasion of the power cable of a welding gun as the power cable passes from a bellows connector into the welding gun handle, an abrasion-resistant sleeve is positioned over the power cable at that location.

11 Claims, 2 Drawing Sheets

38
28
4
26
22
4
12
32
30
40
24

40
36
34
24
34
36

46
42
44
46
18
40
40

WELDING GUN CABLE SADDLE

FIELD OF INVENTION

The present invention relates to welding guns.

BACKGROUND TO THE INVENTION

Welding guns for application of a weld to a desired site generally are provided at the remote end of a conduit in which is located a continuous weld wire extending from a wire source and a power cable extending from a power source. Often such welding guns are of the vacuum type which permit undesirable fumes and smoke to be removed from the welding site through the conduit.

Traditionally, this conduit has been of corrugated construction along the whole length thereof, both such structure provides no support for the weld wire or power cable and can wear through to expose the electrical power cable.

In my U.S. Pat. No. 4,496,823, the disclosure of which is incorporated herein by reference, there is described a novel multipassage flexible smooth-surfaced conduit which overcomes the problems of the prior art. In some instances, however, the conduit of my U.S. Pat. No. 4,406,823 is not sufficiently flexible to permit the ideal maneuverability of the welding gun head to make welds, particularly in hard-to-get-at locations.

For this reason, I invented a bellows-like flexible connector to connect the smooth-surfaced conduit to the welding gun head to permit the welding gun to be turned about universally with respect to the conduit. That structure forms the subject of my U.S. patent application Ser. No. 307,921 filed Feb. 9, 1989, the disclosure of which is incorporated herein by reference.

It has been found that, in the use of welding guns provided with such a bellows connector, it sometimes occurs that the upstream tubular fibrous or plastic end of the welding gun handle abrades the power cable at that location, with the potential for exposing the cable wire and causing a short circuit.

SUMMARY OF INVENTION

In accordance with the present invention, an abrasion-resistant sleeve is provided over the power cable at the location of the upstream end of the welding gun handle to avoid the prior art problem.

DESCRIPTION OF PREFERRED EMBODIMENT

Figure 1:
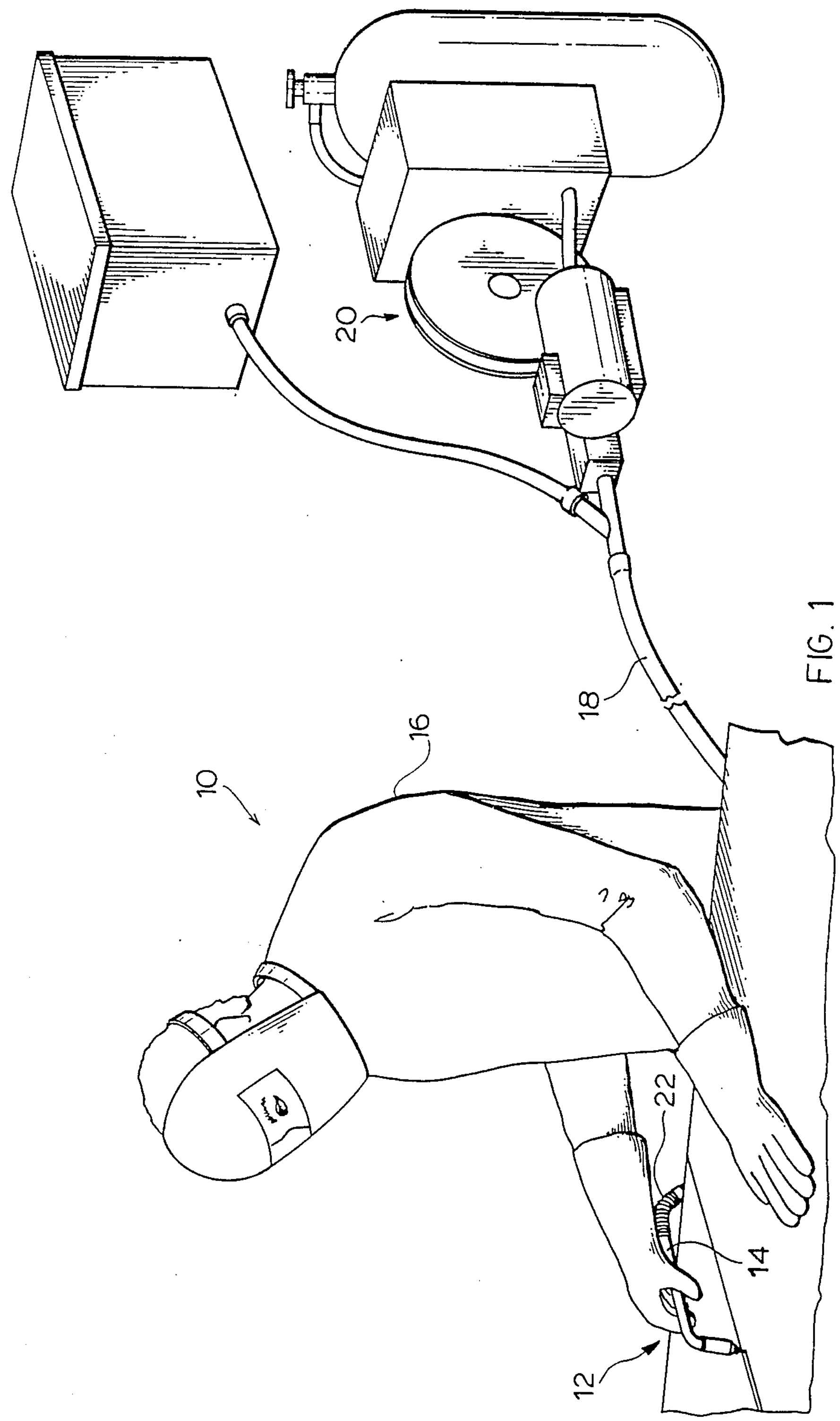
FIG. 1 is a schematic representation of a fume-extracting welding apparatus into which can be incorporated an abrasive resistant sleeve in accordance with one embodiment of the invention.

Referring to the drawings, FIG. 1 illustrates schematically a fume-extracting welding gun 10 including a head portion 12, a control handle portion 14 gripped by a welder 16 during operation, a flexible connector hose portion 18 and a services supply portion 20. The connector hose 18 preferably is constructed as described in my U.S. Pat. No. 4,496,823, the disclosure of which is incorporated herein by reference. The welding gun head 12 may be constructed as described in my U.S. Pat. No. 4,727,238, the disclosure of which is incorporated herein by reference. The welding gun head 12 is connected to the hose 18 through a bellows connector 22, which may take the form described in my U.S. patent application Ser. No. 307,921 referred to above.

The bellows connector 22 comprises a plurality of individual bellows elements 24 which are integrally joined one to another so as to be resiliently flexible and permit universal movement of the welding gun head 12 with respect to the conduit 18. A swivel joint, such as is described in my copending U.S. patent application Ser. No. 434,273 filed 11/13/89 ("Swivel"), the disclosure of which is incorporated herein by reference, may be provided between the downstream end of the conduit or hose 18 and the upstream end of the bellows connector 22.

To prevent inadvertent crushing and collapse of the bellows connector 22 in use, such as may occur when the welding gun is gripped at the connector, a series of resilient rings 26 is provided spaced apart substantially equally along the length of the connector. The rings are located in the apices of individual ones of the bellows elements 24.

The bellows connector 22 is joined to the upstream end of the welding handle 14 in any convenient manner. As illustrated, the tubular upstream end 28 of the welding gun handle 14 extends snugly into a tubular extension 30 of the bellows connector 22 and a clamp 32 is employed surrounding the extension 30 to be tightened onto the extension 30 and to grip the upstream end 28.

Figures 2, 3, 4, 5:
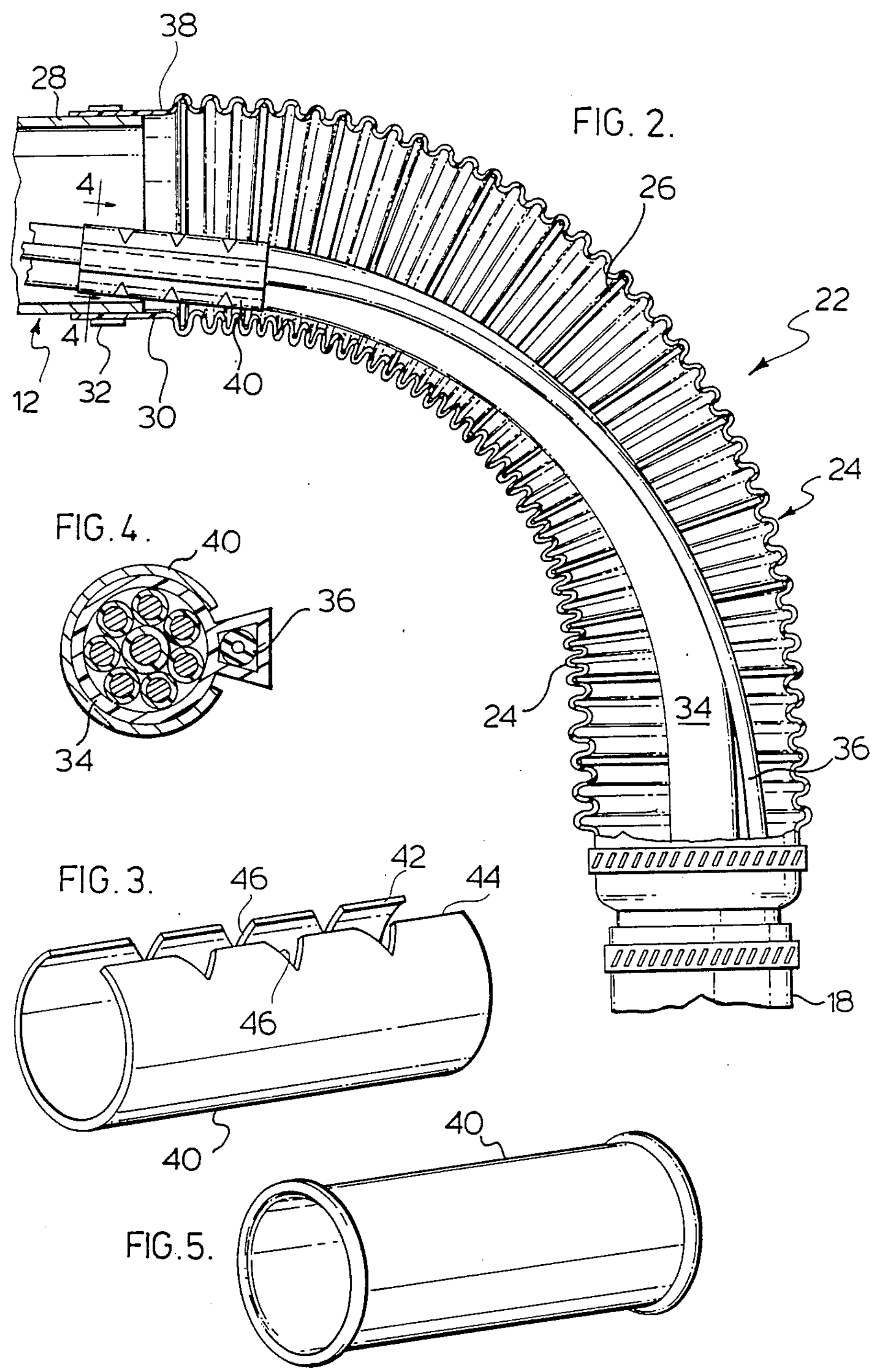
FIG. 2 is a sectional view of a bellows-like connector of a welding gun showing an embodiment of abrasion-resilient sleeve in accordance with the invention.
FIG. 3 is a perspective view of the abrasion-resistant sleeve.
FIG. 4 is a sectional view taken on line 4—4 of FIG. 2.
FIG. 5 is a perspective view of an alternative embodiment of abrasion-resistant sleeve.

As may be seen from FIG. 2, a power cable 34, which houses a welding wire in sliding relation therewith, passes through the bellows connector 22 and into the welding gun head 12. Other utility requirements, such as a feed of shielding gas and a feed of electrical control power wire, usually also pass through the bellows connector 22, such as by conduit 36.

In accordance with the present invention, in order to protect the power cable 34 from abrasion by the edge 38 of the handle 14 which forms the upstream end of the welding gun, an abrasion-resistant sleeve 40 is mounted on the outer surface of the power cable 34 in the region of this edge. By providing the sleeve 40 in this way, the possibility of severe abrasion to the power cable exposing and shorting or even severing the power wire is avoided.

As illustrated, the sleeve 40 comprises a part-cylindrical structure having an inside diameter slightly less than the outside diameter of the cable, so as to grip the cable when positioned thereon and resist accidental displacement to a non-operative position.

The sleeve 40 is formed of abrasion-resistant resiliently-flexible material and may be formed as a one-piece plastic molded or metal article of part-cylindrical shape, to facilitate mounting of the sleeve 40 on the cable 34 in gripping relationship thereto to resist longitudinal displacement along the power cable. The sleeve 40 may be crimped onto the cable 34 with the curvilinear extremities turned to grip into the surface of the cable 34.

The sleeve 40 comprises a body which extends to curvilinear extremities. At each of the curvilinear extremities 42 and 44 are formed three V-shaped notches 46. The sleeve 40 is useful where there exists a gas feed tube 36 which is supported adjacent the external surface of the power cable 36. However, where such a requirement is absent, such as in a non-shielding gas welding gun, the sleeve may take the form of a tube 40 (see FIG. 5), which is crimped onto the power cable 34 at the desired location.

SUMMARY OF THE INVENTION

In summary of this disclosure, the present invention provides a novel sleeve structure for a power cable of a welding gun to prevent abrasion of the power cable. Modifications are possible within the scope of this invention.

What I claim is:

1. A welding gun, comprising:
   - a welding gun head for applying a weld to a site and a welding gun handle,
   - a conduit for conveying an electrical power cable to said welding gun handle,
   - flexible bellows connector means connecting said welding gun handle to said conduit,
   - an electrical power cable passing through said conduit and said flexible bellows connecting means to said welding gun handle, and
   - abrasion-resistant sleeve means mounted to said power cable adjacent the location of connection of said bellows connector means to said welding gun handle.

2. The welding gun of claim 1, wherein said sleeve means comprises a part-cylindrical elongate flexible member grippingly mounted to said cable to resist longitudinal displacement along said cable.

3. The welding gun of claim 2 wherein said flexible member has curvilinear extremities which are turned to grip into said power cable.

4. The welding gun of claim 2 wherein said flexible member has curvilinear extremities and three V-shaped notches are provided in each of said curvilinear extremities substantially equally spaced one from another.

5. The welding gun of claim 1, wherein said sleeve means comprises an elongate tubular member grippingly mounted to said cable.

6. The welding gun of claim 1, wherein a plurality of resilient rings is disposed internally and at longitudinally-spaced locations along the length of said bellows connector means to resist deformation of said bellows connector means upon the external application of radially-inward pressure thereto.

7. The welding gun of claim 6 wherein said flexible bellows connector means is of generally cylindrical shape and comprising a plurality of individual bellows members integrally joined one to another so as to be resiliently flexible.

8. The welding gun of claim 7 wherein said resilient rings are located at the radially-outward apex of individual ones of said individual bellows members.

9. The welding gun of claim 8 wherein there is a lesser plurality of said resilient rings than of said individual bellows means and said resilient rings are substantially equally spaced apart along the length of said bellows connector means and located in said apices.

10. The welding gun of claim 9 wherein said flexible bellows connector means includes elongate smooth surfaced tubular portions at each longitudinal end thereof to effect connection to said welding gun handle and said conduit.

11. The welding gun of claim 10 wherein the upstream end of said welding gun handle extends snugly into one of said tubular portions and clamps surround and are tightened to said tubular portion to effect a secure connection.

* * * * *